Nov. 25, 1958 E. M. PALMER 2,861,752
FILM TRANSPORT MECHANISM
Original Filed Jan. 24, 1956 3 Sheets-Sheet 1

INVENTOR.
Elton M. Palmer.
BY
ATTORNEY:-

United States Patent Office 2,861,752
Patented Nov. 25, 1958

2,861,752

FILM TRANSPORT MECHANISM

Elton M. Palmer, Oakmont, Pa., assignor to Gulf Research & Development Company, Pittsburgh, Pa., a corporation of Delaware Original application January 24, 1956, Serial No. 561,085. Divided and this application May 22, 1956, Serial No. 586,519

6 Claims. (Cl. 242—55.11)

This invention pertains to an apparatus for longitudinally accurately positioning an elongate strip of photographic film.

This application is a division of my copending application, Serial No. 561,085 filed January 24, 1956, assigned to the same assignee as the present application.

There are numerous occasions when it is necessary to accurately position a photographic film for purposes of exposure, etc., and subsequently move the film an accurately controlled distance or increment of length. This may be done, for instance, by perforating the film near its edges, and advancing and positioning the film in increments which are predetermined by the spacing of the perforations. In cinematography, for example, the film is advanced and positioned by use of pull-down fingers engaging successive perforations. However, in such applications the increments cannot readily be varied along the length of film, since they are predetermined by the perforation spacing, and further the smallest increment the film can be advanced and positioned is in general no less than the distance between the centers of adjacent perforations. A film drive employing sprocket wheels which are rotated in predetermined angular increments and whose teeth positively engage the perforations, although not subject to the above-described limitations, may however be unsuitable in certain applications. In the seismograph profile printer which forms the subject matter of the aforementioned copending application Serial No. 561,085, there is employed a photographic film strip on which geophysical seismograph record tracks are printed side by side to form a seismic profile. In order to preserve the longitudinal scale at which the profile is made, it is necessary to advance the film by a predetermined fixed increment between each track printing. Because of the width of the film employed (which is about twenty inches wide) and the resulting large separation of the rows of perforations, it is impractical to employ perforated film, which would also materially increase the film cost. Furthermore, the projecting sprocket teeth would mechanically interfere with the scanning process which in the seismograph profile printer takes place in a direction transverse to the long dimension of the profile film.

Accordingly, it is an object of this invention to provide a film transport apparatus which moves a photographic film accurately a predetermined increment.

It is another object of this invention to provide a film transport apparatus by means of which a photographic film may be accurately and repeatedly advanced by a predetermined amount.

It is another object of this invention to provide a film transport apparatus in which the predetermined repeated increments of motion may be easily varied.

These and other useful objects of this invention are attained as described in this specification of which the drawings form a part, and in which Figure 1 is a partly diagrammatical end view of the apparatus;

Figure 2(a) is an enlarged fragmentary perspective view of the clutch; and

In the apparatus of this invention the photographic film is carried from a supply roll to a take-up roll over a printing roller which is geared to a ratchet wheel whose pawl controls a switch. In advancing the film the take-up roll is turned, preferably by an electric motor, until the pawl rises over the ratchet tooth and drops into the succeeding ratchet recess, whereupon the pawl-actuated switch causes the supply roll to be rewound, preferably by an electric motor, until the rear face of the ratchet tooth comes to rest tightly against the pawl so that the ratchet wheel can go no further, thus accurately positioning the film on the printing roller. While the invention will be described as it is applied to the aforementioned seismograph profile printer in which the film is photographically exposed on the printing roller, it is apparent that exposure or other processing may take place anywhere on the film after it has been advanced and accurately positioned by the mechanism described herein.

Figure 1:
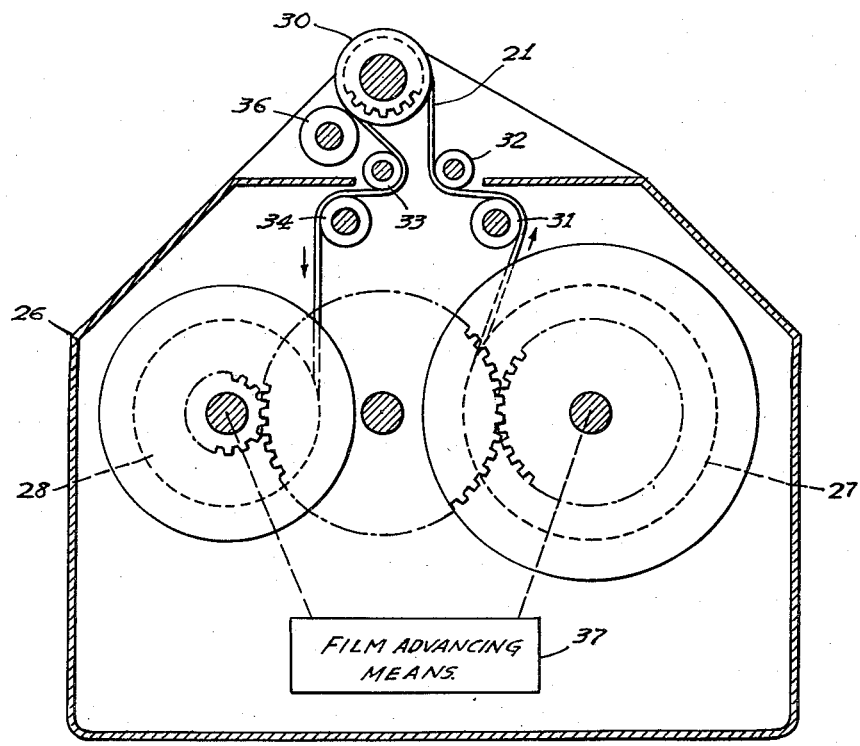

Referring to Figure 1, the mechanism is shown inside an outer case 26 which case may of course include other associated apparatus beside that forming the subject matter of this invention. Figure 1 shows an end view of the film transport mechanism with the film advancing means indicated diagrammatically by 37 to be described in detail later. The mechanism comprises a film supply roll 27 and a film take-up roll 28. The film 21 passes over a printing roller 30 where it is exposed or otherwise processed as desired. The film 21 also passes over additional rollers 31, 32, 33 and 34 which are idlers and which serve to guide the film 21 through appropriate light traps (not shown). It is apparent that the latter may be arranged as desired for the particular use to be made of the apparatus. A pressure roller 36 is spring loaded to press against the roller 30 and thereby holds the film 21 in snug contact with printing roller 30 with sufficient pressure to prevent slippage of the film on the roller 30.

The film 21 is normally supplied wound emulsion side in and moves from the supply roll 27 over the printing roller 30 with its emulsion side out and is wound up again on take-up roll 28 with emulsion side in. The width of the film 21 or axial length of the rolls and rollers may be any desired amount as required. The film 21 is shown in Figure 1 as passing over roller 30 for printing at each increment of motion, but if desired the film 21 may be made to traverse other media either before or after its circuit of roller 30 for other purposes. The film-advancing means 37 is mechanically connected to rolls 27 and 28 and is periodically actuated whenever the film 21 is to be moved a predetermined amount for processing the next increment of the film.

Figure 2:
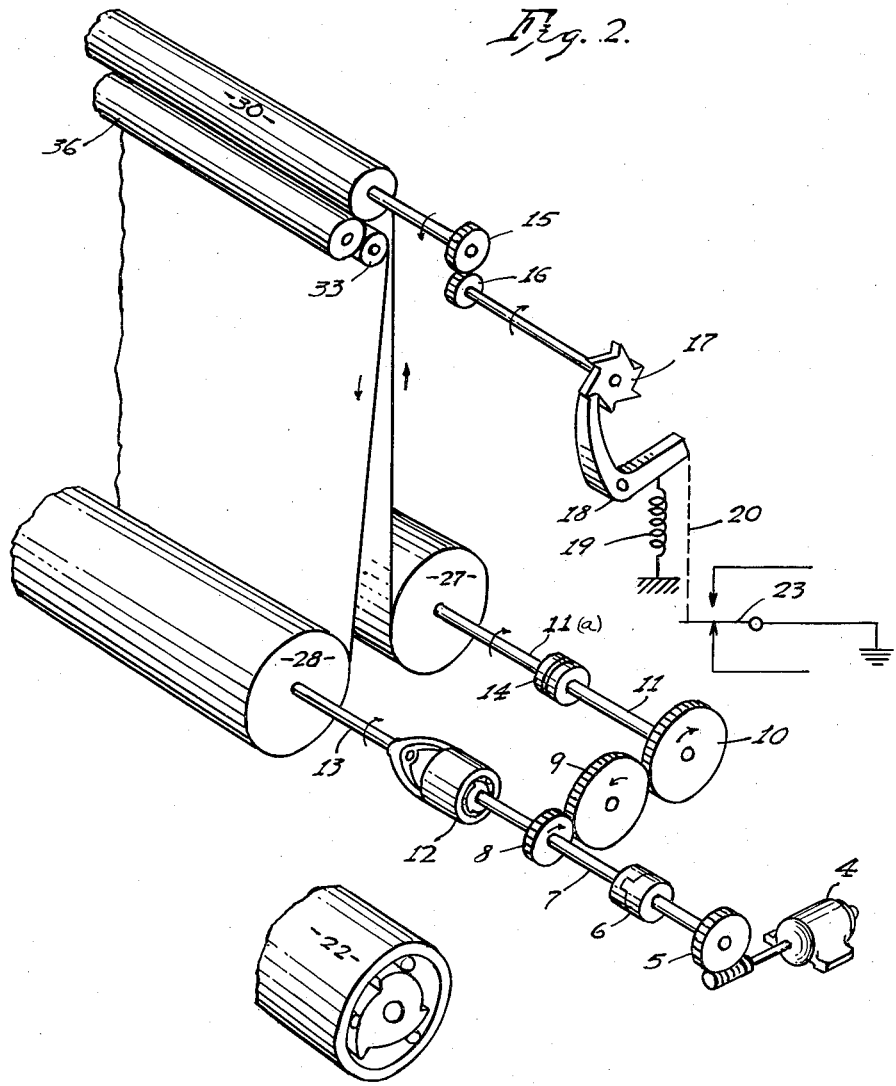
Figure 2 is an exploded view of the apparatus of this invention showing the relationship of parts.

The film-advancing means (indicated only diagrammatically by 37 in Figure 1) is described with reference to Figure 2 which is an exploded perspective view of the mechanism. In Figure 2 the roll 28 is the film take-up roll and 27 is the film supply roll. The rollers 31, 32, and 34 of Figure 1 are not shown in Figure 2. The film runs off roll 27, over the printing roller 30, between roller 30 and pressure roller 36, over roller 33, and on to the take-up roll 28. A reversible D.-C. electric motor 4 drives the mechanism through worm gearing 5 and manually-releasable dog-clutch 6. The clutch 6 may conveniently be disengaged by the operator when loading and unloading film from the magazine, this operation ordinarily being done in a photographic dark room. The clutch 6 engages the shaft 7 which has pinned thereto a spur gear 8 which through an idler gear 9 drives the gear 10 which is pinned to shaft 11. The cores of rolls 27 and 28 are conveniently made nearly the same diameter. However, in referring to the rolls 27 and 28, the term effective diameter means the outside diameter of the core and film wound thereon. An important feature of the invention is that gear 8 is considerably smaller in diameter than gear 10. By way of example, it has been found convenient to use 24 teeth on gear 8 and 64 teeth on gear 10. The ratio of the effective diameter of supply roll 27 to the effective diameter of take-up roll 28 should be initially less than the ratio of gear 10 to gear 8, and as film moves from the supply roll to the take-up roll this ratio further decreases.

The shaft 13 forms the axis of take-up roll 28 and is engaged therewith by splines or the like. Between the shaft 7 and the shaft 13 there is an overrunning clutch 12 shown in more detail in the insert (Figure 2(a)). The clutch 12 may, for example, comprise a well-known device having rollers which lock the shaft 7 to the outer cylinder 22 whenever the shaft 7 tends to transmit clockwise torque to cylinder 22, or the cylinder 22 tends to transmit counter-clockwise torque to shaft 7, but the clutch 12 is otherwise disengaged. The action of the clutch 12 is such that when the motor 4 rotates the shaft 7 clockwise with respect to shaft 13, the clutch 12 engages and transmits the clockwise torque from shaft 7 to shaft 13 and the take-up roll 28. However, when the motor 4 rotates in the opposite direction to turn shaft 7 counter-clockwise with respect to shaft 13, the clutch 12 disengages and no counter-clockwise torque is transmitted from shaft 7 to roll 28. A slippable coupling 14 in the nature of a slip clutch capable of transmitting limited torque in either direction is interposed in shaft 11. This provides that the shaft 11(a) of supply roll 27 may be turned in either direction by the shaft 11, but only with limited torque beyond which slippage of clutch 14 occurs. Clutch 14 is preferably a friction clutch with the pressure between its friction elements so adjusted that rotation of shaft 11 will rotate the supply roll 27 but that slippage of clutch 14 will occur without slippage of the film on roller 30 if the latter should be locked or retarded and without tearing the film 21. Alternatively to the friction clutch 14 other equivalent devices may be employed, as for example a magnetic clutch or any device capable of transmitting adequate but limited torque in either direction of rotation.

Rotation of roller 30 actuates a cam with appropriate cam follower to actuate the control circuit. Preferably the cam is in the form of a ratchet wheel 17 which is rotated in proportion to rotation of roller 30 by means of gears 15 and 16. A cam follower in the form of a pawl 18 bearing on the ratchet wheel is depressed by tension spring 19. A pivoted but otherwise rigid mechanical link (indicated by 20) connects the pawl 18 with a snap-action switch 23 in such manner that when the pawl rests at the root of a ratchet tooth, as shown in Figure 2, contacts of the switch 23 are in normal position (as shown in Figure 2), but when the pawl is raised as in passing over a ratchet tooth the switch 23 is actuated.

Operation of the film-advancing means shown in Figure 2 may now be described. Consider clutch 6 to be engaged and that the film 21 is threaded as shown from roll 27 to roll 28 over the roller 30. When it is desired to advance the film 21 for exposure or processing of the next increment, appropriate control circuits to be described energize the motor 4 so that it rotates the shaft 7 in the direction of the arrow. This engages clutch 12 and take-up roll 28 rotates to wind up the film 21. Shaft 11 rotates also in the direction of the arrow, but its angular velocity is less than that of the shaft 11(a) inasmuch as the ratio of gear 10 to gear 8 is larger than the ratio of effective diameters of rolls 27 to 28, as explained above. Thus, because shaft 11(a) rotates at a higher angular velocity than shaft 11, slippage occurs between the discs of friction clutch 14. The frictional torque thus developed maintains desired tension on the film 21.

Passage of film 21 over the roller 30 effects tractive rotation of roller 30 by the firm contact provided by the pressure roller 36 and by the tight wrapping effect resulting from film tension provided by clutch 14 as explained above. Rotation of the roller 30 effects rotation of ratchet wheel 17 and pawl 18 is lifted up on to a ratchet tooth. This operates the snap-action switch 23 which cocks the control circuit of motor 4, whereupon subsequent release of switch 23, when the pawl 18 drops into the next notch, causes the control circuit to reverse rotation of motor 4.

Motor 4 of course coasts a small amount before reversing so that actually the ratchet wheel 17 has by this time advanced slightly beyond the point at which the pawl dropped. With the motor reversal, shaft 11 rotates in the direction opposite to the arrow in Figure 2 and through the friction clutch 14 drives the shaft 11(a) and the supply roll 27 in the direction opposite to the arrows. Accordingly film 21 rewinds on the supply roll 27. As before, the angular velocity of shaft 11 is less than that of the driving shaft 7 inasmuch as gear 10 is larger than gear 8. Meanwhile, film is withdrawn from the take-up roll 28 which rotates opposite to the direction of the arrow. Because of the ratios previously explained, the take-up roll 28 rotates at a lower (counter-clockwise) angular velocity than shaft 7 and consequently the overrunning clutch 12 is disengaged. The film 21 rewinds on roll 27 until the rear face of the ratchet tooth comes sharply up to the pawl 18, whereupon rotation of the roller 30 is arrested. The film cannot wind further on roll 27 because of the firm contact of the film 21 with the roller 30 provided by the pressure roller 36 and by the wrapping of the film around roller 30, so that friction clutch 14 slips. The film 21 is thus accurately positioned.

It is apparent that the roll 27 can rewind only a very small length of film before it is stopped and this only takes a fraction of a second. Accordingly after an appropriate time delay the control circuit shuts the motor off. The latter expedient avoids continually supplying power to the motor which power would be dissipated in the friction clutch 14, but it is apparent that other types of motor shut-off means may alternatively be provided, e. g., one which shuts off motor power after a predetermined degree of rotation of shaft 11 or shaft 7 opposite to that shown by the arrows.

In the application of this invention to the aforementioned seismograph profile printer it is convenient to make the effective diameter of the printing roller 30 equal to one inch and make the ratio of gears 15 and 16 equal to pi, conveniently 44/14. In such case one revolution of gear 16 corresponds to the passage of one inch of film over the top of roller 30. This arrangement provides for as many film intervals per inch as there are teeth on the ratchet 17. Accordingly, if it is desired to change the film intervals, it is merely necessary to remove and replace the ratchet wheel 17 with one whose number of teeth equals the desired number of film intervals per inch. In any other application of the device one may so adjust the gear ratio between gears 15 and 16 and choose the effective diameter of roller 30, or both, so that the number of teeth of ratchet 17 corresponds to any desired convenient measure of film interval.

It has been found desirable to employ a spring-loaded lever (not shown) to continuously bear against the take-up roll 28 so as to make frictional contact and thereby moderately restrain counter-clockwise (Figure 2) rotation of the roll 28 when clutch 12 is disengaged. This avoids uncoiling of film from roll 28 and the resulting need for rewinding the loosened film when proceeding forward on the next operation.

Figure 3:
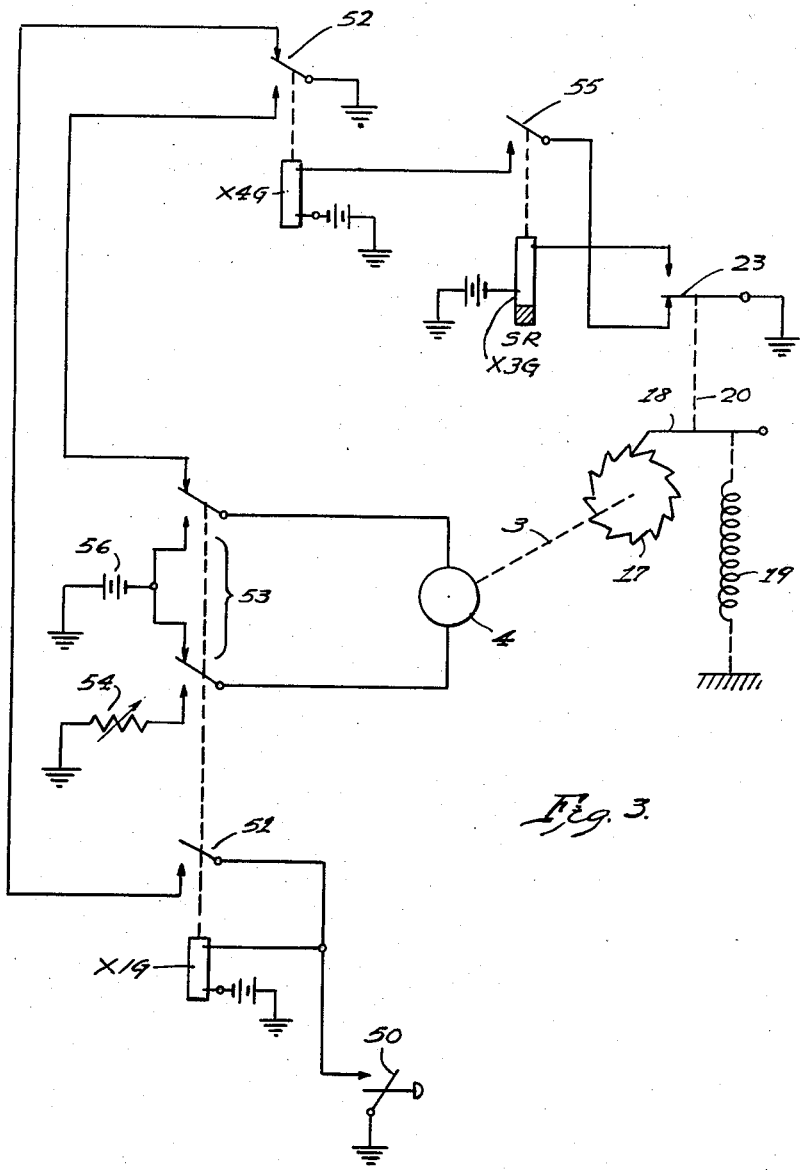
Figure 3 is a wiring diagram of the electrical control circuit employed.

The control circuit may now be described with reference to Figure 3. The ratchet wheel 17 and motor 4 are shown diagrammatically connected by a broken line 3 which represents the mechanism of Figure 2 described above. The pawl 18 is shown depressed by spring 19 and the pawl actuates switch 23 by means of mechanical linkage 20. Three relays X1G, X3G, and X4G are employed in the control circuit and these relays have the contact arrangements indicated in Figure 3. In the figure the relays are all shown in their deenergized position. Relay X3G is of the slow-release type, preferably having a release delay of from 0.1 to 0.5 second. Relays X1G and X4G are of the ordinary type without delay. A battery 56 is provided to drive the motor. Each of the relay coils are also shown in circuit with a battery these being shown as separate batteries merely for purposes of convenience and clarity in the diagram, it being clear that any and all of the batteries shown may be combined as desired. A push button 50, preferably of the snap-action type, is shown in Figure 3 as the means for initiating actuation of the mechanism. The button 50 is pressed only momentarily and may alternatively comprise other manual or automatic apparatus for momentarily closing the circuit at 50 when it is desired to initiate operation of the film transport mechanism.

Momentary pushing of the button 50 establishes a circuit through the coil of relay X1G which closes contact 51 thereby locking the relay X1G operated since a circuit exists through the contact 52 of relay X4G. Energization of relay X1G also connects battery 56 to the motor through reversing contacts 53 and resistor 54. This connection is arranged to rotate the motor in the proper direction to effect rotation of shaft 13 of Figure 2 in the direction of the arrow and rotate the take-up roll 28 to wind up film 21. The resistor 54 is in the motor circuit to control the forward speed of the motor to a desired value. The motor 4 thus advances the film 21 which in passing over the printing roller 30 causes the ratchet wheel 17 to advance, and the pawl 18 rides up on the ratchet tooth. As the pawl rises it actuates switch 23 and when switch 23 contacts its upper contact a circuit is established through the coil of relay X3G so as to close its contact 55. Since however the lower contact of switch 23 is now open, this does not establish a circuit through the relay X4G, but the circuit is now cocked for reversing the motor. The switch 23 is preferably of the snap-action type which makes connection to either of its contacts but has no intermediate position.

As the motor 4 winds up the film and advances the ratchet wheel 17, the pawl 18 eventually drops over the crest of the tooth and upon doing so switch 23 is again transferred to its lower contact. Inasmuch as relay X3G is of the slow-release type, a circuit is effected through switch 23 and contact 55 to energize the coil of X4G. The coil X4G is energized during the delay period of relay X3G. As soon as X4G is energized its contact 52 drops to the lower contact which breaks the circuit holding relay X1G operated. Upon release of X1G the reversing contacts 53 return to the configuration shown in Figure 3, ground being established by relay contact 52. Current from battery 56 is now supplied to the motor 4 in the reverse direction thus quickly stopping and reversing the motor. Inasmuch as it is desired to stop the motor promptly and bring the film back to its correct position, no series resistance is inserted in the motor-reversal circuit. As previously explained, the motor rewinds the film until the rear face of the tooth which has just passed under the pawl 18 comes tightly against the pawl. The pawl arrests the ratchet wheel and this stops the motion of the film. The motor may thereafter slip the clutch 14 for a short interval of time. The motor-reversal circuit is established however only during the delay period of relay X3G. At the end of this delay period the relay X3G releases, contact 55 opens, and contact 52 again returns to the upper position. The circuit and the mechanism is now ready for another sequence of operation whenever a momentary closure of the circuit occurs at 50.

In order to adjust the delay of slow-release relay X3G, a condenser (not shown) may be connected in parallel with the coil of this relay. Substantial adjustment of the delay time may be obtained by choice of the capacity of the condenser. Alternatively two or more slow-release relays similar to X3G may be connected in cascade to further increase the delay time.

In Figure 3 a resistor 54 is shown connected in the forward circuit of the motor whereas no resistor is shown in the reverse circuit of the motor, but it is apparent that the forward and reverse speeds may be controlled by including or omitting appropriate resistors in the circuit as desired, or by slightly modifying the circuit to provide batteries of differing voltage for each direction of rotation. The motor 4 is shown as a permanent-magnet type motor which is reversed simply by changing the direction of its armature current, but it is apparent that a motor employing a wound field may be employed in which case the armature current only is connected to the reversing contacts 53. It is also contemplated that a three-wire reversible motor may be employed in which event the battery 56 is connected through appropriate contacts of relays X1G and X4G to effect reversal of the motor.

If it is desired to advance the film a number of teeth without stopping the film, the push button 50 is held continuously closed. When this is done the motor 4 will continue to rotate in the forward direction to wind up the film until the push button 50 is released. Upon opening the circuit at 50 the device will usually complete a cycle of operation and the film will be positioned accurately corresponding to the ratchet tooth over which the pawl may be riding at the moment the button is released. However, the button might perchance be released during what would be the reverse motion interval and if so the direction of rotation of the motor may reverse, but the motor may stop before the rear face of the ratchet tooth comes against the pawl, and in order to avoid this condition it is advisable to momentarily again push the button 50 after the button has been held closed for any protracted time.

What I claim as my invention is:

1. Apparatus for stepwise advancing a photographic film through predetermined successive increments which comprises a film supply roll, a film take-up roll, a roller traversed by and tractively engaging the film intermediate said supply roll and said take-up roll, means for providing traction between the film and said roller, controllable driving means capable of forward and reverse motion, an overrunning clutch connected between said driving means and said take-up roll arranged so that said driving means rotates said take-up roll only in a direction to wind up film thereon upon forward motion of said driving means, coupling means connected between said driving means and said supply roll capable of transmitting limited torque and tending to rotate said supply roll in a direction to rewind film thereon upon reverse motion of said driving means, control means connected to said driving means adapted to effect forward motion thereof, control means connected to said driving means adapted to effect reverse motion thereof responsive to a predetermined amount of forward rotation of said roller, and means adapted to arrest reverse rotation of said roller at a predetermined position thereof.

2. Apparatus for stepwise advancing a photographic film through predetermined successive increments which comprises a film supply roll, a film take-up roll, a roller traversed by and tractively engaging the film intermediate said supply roll and said take-up roll, means for providing traction between the film and said roller, controllable driving means capable of forward and reverse motion, an overrunning clutch connected between said driving means and said take-up roll arranged so that said driving means rotates said take-up roll only in a direction to wind up film thereon upon forward motion of said driving means, coupling means connected between said driving means and said supply roll capable of transmitting limited torque and tending to rotate said supply roll in a direction to rewind film thereon upon reverse motion of said driving means, control means connected to said driving means adapted to effect forward motion thereof, a cam actuated by rotation of said roller, a cam follower bearing on said cam, control means actuated by said cam follower and connected to said driving means adapted to effect reverse motion thereof, and means to arrest reverse rotation of said roller at a predetermined position thereof.

3. Apparatus for stepwise advancing a photographic film through predetermined successive increments which comprises a film supply roll, a film take-up roll, controllable driving means capable of forward and reverse motion, an overrunning clutch connected between said driving means and said take-up roll arranged so that said driving means rotates said take-up roll only in a direction to wind up film thereon upon forward motion of said driving means, slip-clutch means connected between said driving means and said supply roll capable of transmitting limited torque for either direction of motion of said driving means and tending to rotate said supply roll in a direction to rewind film thereon upon reverse motion of said driving means, means connecting said driving means through said respective clutches to said respective rolls tending to effect faster wind up of film on said take-up roll than unwind of film from said supply roll, control means connected to said driving means adapted to effect forward motion thereof, control means connected to said driving means adapted to effect reverse motion thereof and responsive to a predetermined amount of forward motion of the film, and means tractively engaging said film adapted to arrest reverse motion thereof at a position that is a predetermined increment behind the preceding arrested position.

4. Apparatus for stepwise advancing a photographic film through predetermined successive increments which comprises a film supply roll, a film take-up roll, a roller traversed by and tractively engaging the film intermediate said supply roll and said take-up roll, means for providing traction between the film and said roller, controllable driving means capable of forward and reverse motion, an overrunning clutch connected between said driving means and said take-up roll arranged so that said driving means rotates said take-up roll only in a direction to wind up film thereon upon forward motion of said driving means, slip-clutch means connected between said driving means and said supply roll capable of transmitting limited torque for either direction of motion of said driving means and tending to rotate said supply roll in a direction to rewind film thereon upon reverse motion of said driving means, means connecting said driving means through said respective clutches to said respective rolls tending to effect faster wind up of film on said take-up roll than unwind of film from said supply roll, control means connected to said driving means adapted to effect forward motion thereof, control means connected to said driving means adapted to effect reverse motion thereof and responsive to a predetermined amount of forward rotation of said roller, and means adapted to arrest reverse rotation of said roller at a predetermined position thereof.

5. Apparatus for stepwise advancing a photographic film through predetermined successive increments which comprises a film supply roll, a film take-up roll, a roller traversed by and tractively engaging the film intermediate said supply roll and said take-up roll, means for providing traction between the film and said roller, controllable driving means capable of forward and reverse motion, an overrunning clutch connected between said driving means and said take-up roll arranged so that said driving means rotates said take-up roll only in a direction to wind up film thereon upon forward motion of said driving means, slip-clutch means connected between said driving means and said supply roll capable of transmitting limited torque for either direction of motion of said driving means and tending to rotate said supply roll in a direction to rewind film thereon upon reverse motion of said driving means, means connecting said driving means through said respective clutches to said respective rolls tending to effect faster wind up of film on said take-up roll than unwind of film from said supply roll, control means connected to said driving means adapted to effect forward motion thereof, a ratchet wheel geared to said roller, a pawl bearing on said ratchet wheel permitting forward rotation thereof, and control means actuated by said pawl and connected to said driving means adapted to reverse motion thereof.

6. Apparatus for stepwise advancing a photographic film through predetermined successive increments which comprises a film supply roll, a film take-up roll, a roller traversed by and tractively engaging the film intermediate said supply roll and said take-up roll, means for providing traction between the film and said roller, controllable driving means capable of forward and reverse motion, an overrunning clutch connected between said driving means and said take-up roll arranged so that said driving means rotates said take-up roll only in a direction to wind up film thereon upon forward motion of said driving means, slip-clutch means connected between said driving means and said supply roll capable of transmitting limited torque for either direction of motion of said driving means and tending to rotate said supply roll in a direction to rewind film thereon upon reverse motion of said driving means, means connecting said driving means through said respective clutches to said respective rolls tending to effect faster wind up of film on said take-up roll than unwind of film from said supply roll, control means connected to said driving means adapted to effect forward motion thereof, a ratchet wheel geared to said roller, a pawl bearing on said ratchet wheel permitting forward rotation thereof, control means actuated by said pawl and connected to said driving means adapted to reverse motion thereof, and means connected to said driving means adapted to stop said driving means after limited reverse motion thereof.

References Cited in the file of this patent

UNITED STATES PATENTS

| | | |
|---|---|---|
| 2,468,198 | Heller | Apr. 26, 1949 |
| 2,673,041 | Hittle | Mar. 23, 1954 |
| 2,673,692 | Seyerlein | Mar. 30, 1954 |
| 2,686,012 | Gabel et al. | Aug. 10, 1954 |